United States Patent
Kufner et al.

(10) Patent No.: US 12,247,745 B2
(45) Date of Patent: Mar. 11, 2025

(54) CLEANING CHEMICAL ASSEMBLY, CLEANING CHEMICAL MODULAR SYSTEM, AND COOKING APPLIANCE

(71) Applicant: RATIONAL Aktiengesellschaft, Landsberg am Lech (DE)

(72) Inventors: Christian Kufner, Landsberg am Lech (DE); Filip Lindell, Landsberg am Lech (DE); Manuel Ulmer, Landsberg am Lech (DE)

(73) Assignee: RATIONAL AKTIENGESELLSCHAFT (DE)

( * ) Notice: Subject to any disclaimer, the term of this patent is extended or adjusted under 35 U.S.C. 154(b) by 450 days.

(21) Appl. No.: 17/369,721

(22) Filed: Jul. 7, 2021

(65) Prior Publication Data
US 2022/0010969 A1   Jan. 13, 2022

(30) Foreign Application Priority Data

Jul. 7, 2020 (DE) .................. 10 2020 117 841.7

(51) Int. Cl.
*F24C 14/00* (2006.01)
*B08B 9/093* (2006.01)
*G06K 7/14* (2006.01)

(52) U.S. Cl.
CPC ............ *F24C 14/005* (2013.01); *B08B 9/093* (2013.01); *G06K 7/1417* (2013.01); *B08B 2209/08* (2013.01)

(58) Field of Classification Search
CPC ................... F24C 14/005; A47L 15/00–508
See application file for complete search history.

(56) References Cited

U.S. PATENT DOCUMENTS

| | | | |
|---|---|---|---|
| 6,213,002 B1 | 4/2001 | Batten et al. | A41J 27/04 |
| 10,767,871 B2 | 9/2020 | Budich | F24C 14/005 |
| 2003/0040984 A1* | 2/2003 | Inami | G06Q 10/087 |
| | | | 705/26.82 |
| 2006/0255061 A1 | 11/2006 | Frieze et al. | B67D 5/08 |
| 2010/0313958 A1 | 12/2010 | Patel et al. | 137/1 |
| 2011/0139199 A1* | 6/2011 | Pyo | A47L 15/4227 |
| | | | 134/115 R |
| 2012/0188076 A1 | 7/2012 | McSheffrey | G08B 1/08 |

(Continued)

FOREIGN PATENT DOCUMENTS

| | | | |
|---|---|---|---|
| DE | 102014202430 | 8/2015 | B08B 3/08 |
| DE | 102014008834 | 12/2015 | F24C 14/00 |

(Continued)

OTHER PUBLICATIONS

U.S. Appl. No. 17/369,708, filed Jul. 7, 2021, Kufner et al.

(Continued)

*Primary Examiner* — Spencer E. Bell
(74) *Attorney, Agent, or Firm* — HAYES SOLOWAY P.C.

(57) ABSTRACT

A cleaning chemical assembly for a cooking appliance has a collection container, a pump, at least two ports for storage containers that contain different cleaning chemicals, and at least one device for identifying the cleaning chemical in the respective storage container. The device for identifying the cleaning chemical is a switching element that is designed to cooperate with a mechanical coding on the respective storage container. The switching element includes a plurality of microswitches at the ports.

9 Claims, 4 Drawing Sheets

(56) References Cited

U.S. PATENT DOCUMENTS

| | | | |
|---|---|---|---|
| 2014/0220184 A1* | 8/2014 | Boggs | G07F 13/065 |
| | | | 426/115 |
| 2017/0128905 A1 | 5/2017 | Pighin et al. | B01J 19/00 |
| 2018/0163972 A1* | 6/2018 | Budich | F24C 14/005 |
| 2019/0301073 A1* | 10/2019 | Kessler | A47L 15/449 |

FOREIGN PATENT DOCUMENTS

| | | | | |
|---|---|---|---|---|
| DE | 102015208634 | 11/2016 | | F24C 14/00 |
| DE | 102015109019 | 12/2016 | | A61L 2/23 |
| DE | 102017110303 | 11/2018 | | F24C 14/00 |
| DE | 102017113372 | 12/2018 | | F24C 14/00 |
| EP | 1793725 | 4/2012 | | D06F 39/02 |
| EP | 2905069 | 8/2015 | | B01F 1/00 |
| EP | 3369476 | 9/2018 | | B01F 5/02 |
| JP | 2001525763 | 12/2001 | | B67D 7/0238 |
| JP | 2006516109 | 6/2006 | | B67D 1/108 |
| WO | WO 2015056063 | 4/2015 | | F24C 14/00 |

OTHER PUBLICATIONS

Official Action issued in U.S. Appl. No. 17/369,708, dated May 25, 2023, 18 pages.
Official Action issued in U.S. Appl. No. 17/369,708, dated Nov. 16, 2023, 27 pages.

\* cited by examiner

CLEANING CHEMICAL ASSEMBLY, CLEANING CHEMICAL MODULAR SYSTEM, AND COOKING APPLIANCE

TECHNICAL FIELD OF THE INVENTION

The invention relates to a cleaning chemical assembly for a cooking appliance, a cleaning chemical modular system for a cooking appliance, and a cooking appliance with such a cleaning chemical modular system.

TECHNICAL BACKGROUND OF THE INVENTION

The cooking appliance is in particular a so-called combination steamer, that is, a cooking appliance for professional application areas, for example in restaurants, company canteens and large-scale catering. The cooking appliance can be used to cook food in hot air, hot steam or a cooking chamber atmosphere with adjustable moisture content and adjustable temperature. In addition, a microwave generator may also be provided, which can be used to generate microwave radiation to assist the cooking process in the cooking appliance.

The cooking appliance involved may also be a so-called pan cooking appliance, which has one or more trough-like pans in which food can be cooked or liquids can be heated in order to then cook the food therein. To this end, each pan includes a heating device, which is typically disposed in the bottom and transfers the heat to the bottom by thermal conduction and thereby to the food or liquids that are in contact with the bottom.

In a cooking appliance, various kinds of soiling will accumulate in the course of operation of the cooking appliance, which may be caused, for example, by liquids as well as vapors originating from a cooking chamber of the cooking appliance. These may be, for example, condensate dripping from the walls of the cooking chamber and/or from food and food carriers located in the cooking chamber, vapors or deposits such as grease or other substances. Moreover, limescale deposits may develop as a result of the water used.

For this reason, it must be possible to reliably clean a cooking appliance at regular intervals. The challenge involved here is that, due to the different types of soiling, different cleaning solutions have to be employed in order to allow a sufficient cleaning effect to be achieved.

The object of the invention is to indicate a way to generate different cleaning solutions for a cooking appliance as needed.

SUMMARY OF THE INVENTION

According to the invention, the object is achieved by a cleaning chemical assembly for a cooking appliance, including a collection container, a pump, at least two ports for storage containers that contain different cleaning chemicals, and at least one means for identifying the cleaning chemical in the respective storage container, wherein the means for identifying the cleaning chemical is a switching element that is designed to cooperate with a mechanical coding on the respective storage container. The switching element includes a plurality of microswitches at the ports.

Since the cleaning chemical assembly according to the invention includes a means for identifying the cleaning chemical for each of the respective storage containers, it is possible to reliably determine which cleaning chemical is available at which port of the cleaning chemical assembly, even when using a plurality of storage containers with different cleaning chemicals. This allows the same cleaning chemical assembly to be employed in cooking appliances that are utilized for different applications, each of which requires different cleaning chemicals.

Of course, there may also be more than two ports in order to be able to make a larger number of storage containers available. In this way, a larger number of different cleaning chemicals can be available in the cleaning chemical assembly and/or a plurality of storage containers each containing the same cleaning chemical can be employed.

In particular, each of the storage containers has a total weight of at most 1.5 kg, preferably at most 1 kg. In this way, it is made sure that the individual storage containers can be handled easily. At the same time, the storage container preferably contains a quantity of cleaning chemical that is sufficient for a multitude of cleaning processes of the cooking appliance.

Preferably, the storage containers are non-destructively detachably fixed to the respective port of the cleaning chemical assembly, so that the storage containers can be replaced in a simple manner when the entire amount of cleaning chemical of the respective storage container has been used up. For example, the port includes a sealing ring with a sealing lip, into which the storage container is inserted. Alternatively, the storage container may include a threaded connection by means of which the storage container is screwed to the port in a liquid-tight manner. Also, a bayonet connection may be employed for fastening the storage containers, as long as a liquid-tight closure is ensured.

In one variant, the cleaning chemical assembly includes, for each port, a flush-out circuit by means of which the pump can direct liquid from the collection container into the storage container in order to flush out a cleaning solution therefrom, the cleaning chemical assembly preferably including a valve block by means of which the flow path of the flush-out circuit is determined.

In other words, the flush-out circuit is used to define through which port the liquid is directed into the storage container associated with the respective port in order to generate a cleaning solution in which the cleaning chemical arranged in the respective storage container is contained.

In one variant, the cleaning chemical assembly includes the collection container, the pump, at least two ports for two storage containers which contain different cleaning chemicals, a water inlet by means of which water can be supplied to the cleaning chemical assembly, a first flush-out circuit by means of which the pump can direct liquid from the collection container into one of the storage containers to flush out a first cleaning solution therefrom, and a second flush-out circuit by means of which the pump can direct liquid from the collection container into another one of the storage containers to flush out a second cleaning solution therefrom, and an outlet port which can be used for pumping liquid to the cooking appliance.

In this way, the cleaning chemical assembly according to the invention can have a particularly compact design in which, using a single pump, both the first and second cleaning solutions can be generated and pumped out of the cleaning chemical assembly in order to clean a cooking appliance. Cleaning processes of the cleaning chemical assembly can also be performed using the single pump.

The cleaning chemical is provided in the storage container in particular in the form of a solid, for example as a block package. As a result of the pump conducting liquid from the collection container into the storage container, at least part of the solid cleaning chemical dissolves in the liquid supplied, so that the cleaning solution is produced. According to the invention, the cleaning solution is in particular an aqueous solution.

According to the invention, the flushed-out cleaning solution is in particular returned to the collection container and can again be pumped to the storage container by means of the pump in order to dissolve more of the cleaning chemical and in this way raise the concentration of the cleaning chemical in the cleaning solution. This allows the cleaning chemical assembly to be given a compact design and to produce a cleaning solution having a desired concentration.

The term "flush-out circuit" thus refers to the flow path that indicates a circuit within the cleaning chemical assembly that is utilized to generate the cleaning solution having a desired concentration.

The outlet port, on the other hand, can be used to feed the cleaning solution produced to further piping systems of the cooking appliance, in particular to a piping system for cleaning the cooking appliance.

The various cleaning solutions may also be chemically incompatible with each other. This is understood to mean that the cleaning solutions would react with each other in such a way that it would not be possible to achieve the respectively intended cleaning effect. For example, the cleaning solutions neutralize each other.

The means for identifying the cleaning chemical is a switching element that is designed to cooperate with a mechanical coding on the storage container.

According to the invention, the port includes a microswitch that is activated by the storage container as soon as the latter is inserted into the port of the cleaning chemical assembly. According to the invention, a plurality of microswitches are provided at the port. In this case, different storage containers that are associated with different cleaning chemicals can trigger a varying number of the microswitches and/or trigger the microswitches in a predetermined time sequence, from which a conclusion can be drawn as to the cleaning chemical held in the storage container.

The switching element may be designed to lock the mechanical coding of the storage container in place in the port in the installation position. This allows the mechanical coding of the storage container to simultaneously serve to identify the cleaning chemical held in the storage container and to mechanically fix the storage container in place in the cleaning chemical assembly.

In a further variant, the means for identifying the cleaning chemical is a readout element that is provided on the cleaning chemical assembly and is designed to read out an identifier on the storage container.

The readout element is more particularly associated with the port of the cleaning chemical assembly. In this way, it can be particularly well ensured that the readout element is arranged as close as possible to the identifier of the storage container and can read it out reliably. In addition, a compact design of the cleaning chemical assembly is made possible.

The readout element may be an optical sensor, in particular a camera that is designed to capture a bar code or a data matrix code, in particular a QR code.

Such optical sensors are available at low cost and are reliable.

The bar code or data matrix code may be applied to the outer surface of an outer wall of the respective storage container or may be applied there in a simple manner prior to insertion of the storage container into the cleaning chemical assembly so that the optical sensor can detect it. Such a configuration is advantageous in particular if the bar code or data matrix code can also be used for further steps of handling the storage container, for example during an ordering and/or delivery process.

The readout element may further include an antenna that is designed to read out an identifier of an RFID tag.

By analogy with the bar code or data matrix code, the RFID tag may be attached to the outside of an outer wall of the respective storage container or be applied there in a simple manner so that the antenna can read it out. Unlike an optical means and an identifier to be detected optically, when an antenna and an RFID tag are used, it is not necessary for them to be in a direct line of sight to each other. This allows a more flexible positioning of the antenna within the cleaning chemical assembly and of the RFID tag on the respective storage container.

In a further variant, the means for identifying the cleaning chemical is a spectroscopy unit that is adapted to identify the cleaning chemical in particular by means of UV/VIS, IR and/or Raman spectroscopy. The spectroscopy unit may be a miniaturized spectroscopy unit that is attached to the respective port and is configured to perform a spectroscopy measurement on the respective cleaning chemical. The precision of the spectroscopy unit only needs to be high enough to allow the cleaning chemicals considered for the respective cooking appliance to be reliably distinguished from one another, for example by means of a comparison with reference spectra stored for the respective cleaning chemicals. UV/VIS, IR and Raman spectroscopy are particularly well suited for fast and non-contact measurement.

The means for identifying the cleaning chemical may also be made use of to identify storage containers that are not intended and/or suitable for the cleaning chemical assembly, and in this way to prevent misuse.

To make sure that a reliable supply of the cleaning chemical can be ensured at all times, two storage containers may contain the same cleaning chemical, and a switchover valve may be provided that can be switched between a first state, in which the pump can pump liquid from the collection container to the first of the two storage containers while the second storage container is disconnected in a liquid-tight manner, and a second state, in which the pump can pump liquid from the collection container to the second storage container while the first storage container is disconnected in a liquid-tight manner, wherein a sensor is provided that can be used to detect whether one of the two storage containers is empty.

This allows an automatic switchover between the first and second storage containers that contain the same cleaning chemical, so that a cleaning solution can be prepared with the cleaning chemical at all times. In this way, a storage container that has been completely emptied does not have to be replaced immediately in order to be able to provide the cleaning chemical associated with that storage container when required. This increases the flexibility in operating the cleaning chemical assembly.

The switchover valve may also be a valve block that comprises a plurality of valves, in particular when the cleaning chemical assembly is provided with three or more ports.

Preferably, the valve block can be placed in a condition in which an outlet fluid communication exists between the pump and the outlet port. In this way, the same valve block that is utilized to flush out the cleaning solutions can also be employed to pump the cleaning solution generated out of the cleaning chemical assembly. Therefore, no further component is required for this purpose, which allows the cleaning chemical assembly to have a particularly compact design.

Furthermore, the valve block can, in particular, be placed in a further condition in which there exists a drain fluid communication between the pump and a drain port. The drain port can be used to discharge liquids from the cleaning chemical assembly without having to discharge them through the outlet port, and thus through the piping system for cleaning the cooking appliance. This is advantageous in particular when only the cleaning chemical assembly is to be cleaned or an error has been detected while the cleaning solution is flushed out, for example, too high a concentration of the cleaning solution.

In a further variant, the cleaning chemical assembly includes a plurality of outlet ports, wherein the different cleaning solutions can be pumped out of the cleaning chemical assembly through different outlet ports. This allows the different cleaning solutions to be drained into different pipes of the cooking appliance, depending on which parts of the cooking appliance are to be cleaned with the cleaning solution produced. In addition, the particular outlet port only needs to be inert to the cleaning solution drained through it, resulting in an increased flexibility in the selection of the materials used.

The sensor that can be used to detect whether one of the two storage containers is empty may be a temperature sensor, a flow sensor, an acoustic sensor, a conductivity sensor (also referred to as a conductance sensor), an impedance sensor, a capacitive sensor, a pH sensor, a weight sensor, and/or a UV/VIS spectroscopy unit.

The sensor that can be used to detect whether one of the two storage containers is empty may be a capacitive sensor that is arranged such that the liquid directed by the pump into the storage container comes into contact with the capacitive sensor as soon as there is no longer any cleaning chemical in the storage container. In this way, an electric circuit can be closed, the current of which provides the sensor signal.

In a further variant, the sensor that can be used to detect whether one of the two storage containers is empty may be an acoustic sensor that is configured to detect noises in the storage container, for example, the sound made by the liquid directed into the storage container by the pump when it impinges on an inside of the storage container. The acoustic sensor may be arranged on the outside of the storage container so that the sensor does not need to come into direct contact with the liquid and/or the cleaning chemical.

A temperature sensor can infer that a storage container is empty, based on an absence of a temperature change that should occur when cleaning chemical dissolves in the liquid.

By means of a conductivity sensor (also referred to as a conductance sensor) or an impedance sensor, it can be concluded that a storage container is empty if the conductivity measured (or the conductance measured) or the impedance measured remains constant or changes only insignificantly.

Similarly, a pH sensor can be used to determine that the storage container is empty when the pH value no longer changes, changes only insignificantly, or has reached a predetermined value.

The weight sensor is configured in particular to determine the weight of the storage container so that on the basis of a known initial mass of the storage container and a known initial mass of cleaning chemical provided in the storage container, it can be determined that the entire amount of cleaning chemical has been consumed.

A flow sensor in particular is advantageous if the dissolution rate of the cleaning chemical in the liquid or cleaning solution is known. In this case, the volume of liquid or cleaning solution flowing past the sensor can be used to ascertain when the amount of cleaning chemical present in the storage container has been used up.

The type of sensor that can be used to detect whether one of the two storage containers is empty is preferably matched to the cleaning chemical employed, so that the respectively measured value gives a reliable indication of the dissolved amount of cleaning chemical in the cleaning solution.

In principle, the cleaning chemical may also have an additive mixed in, which allows a more reliable detection with the particular sensor used, with the aid of which it can be detected whether one of the two storage containers is empty. For example, the additive is a dye.

The sensor that can be used to detect whether one of the two storage containers is empty may be associated with the respective storage container and/or with the collection container.

In order to be able to determine the concentration of the cleaning chemicals of the cleaning solution, a sensor for concentration measurement is in particular associated with the collection container. Such a sensor may be, for example, a pH sensor, a conductivity sensor (also referred to as a conductance sensor), an impedance sensor, a refractive index sensor and/or a photosensor, for example a UV/VIS spectroscopy unit.

The type of sensor for concentration measurement is preferably matched to the cleaning chemicals employed, so that the respectively measured value constitutes a reliable indication of the dissolved amount of cleaning chemical in the cleaning solution.

Generally, the additive admixed to the cleaning chemical may also be made use of to allow a more reliable detection by means of the particular sensor used for concentration measurement.

To be able to reliably determine the volume of liquid present in the collection container, the latter may have a filling level sensor associated with it. The sensor for concentration measurement may also be utilized as a filling level sensor at the same time. Alternatively or additionally, the volume of liquid in the collection container may be known based on a flow sensor, which is associated with the water inlet, for example.

Moreover, the collection container may have a drinking water protection device associated with it to prevent cleaning solution from exiting the cleaning chemical assembly through the water inlet. The drinking water protection device is, for example, an emergency overflow.

In one variant, the cleaning chemical assembly has a temperature sensor disposed on the collection container.

The inventors have found that during preparation of a cleaning solution, its concentration can already be reliably determined on the basis of the change in temperature of the cleaning solution. This allows very cost-effective sensors to be used without having to employ further and/or more complex sensors.

Preferably, the temperature sensor is configured to measure an initial temperature $T_1$ of the liquid and an actual temperature $T_2$ of the cleaning solution in the collection container.

The term "liquid" in this context refers in particular to water filled into the collection container before cleaning chemical is dissolved in it.

Based on the initial temperature $T_1$ and by comparison to an actual temperature $T_2$, a temperature change can be calculated from which the concentration of the cleaning solution can be inferred. The actual temperature $T_2$ can be measured periodically again or continuously to obtain a temperature profile.

In a further variant, the pump can dissolve cleaning chemical from one of the storage containers in a first operating mode and clean the associated flush-out circuit with the liquid in a second operating mode.

According to the invention, only a single pump is provided, which can be employed both for generating the cleaning solution and for cleaning the flush-out circuit. Accordingly, no further components and, in particular, no additional piping systems and/or pumps need to be provided in order to be able to reliably clean the flush-out circuit. This reduces both the required installation space and the costs in manufacturing the cleaning chemical assembly.

In particular, the pump generates a higher volume flow rate in the first operating mode than in the second operating mode.

The liquid can, for example, be injected or sprayed into the storage container through a nozzle, with the amount of the volume flow specifying the distance which the liquid injected or sprayed in covers within the storage container. This distance is also referred to as the range of throw.

The cleaning chemical may be arranged within the storage container such that based on the range of throw, it is determined whether or not the liquid conducted into the storage container comes into contact with the cleaning chemical.

In this way, in particular, no cleaning chemical is detached from the block package in the storage container in the second operating mode, so that the liquid only flushes out any residues of the cleaning chemical and/or of the cleaning solution located in the flush-out circuit and can clean the flush-out circuit in this way.

Preferably, the pump is a centrifugal pump the speed of which can be open-loop or closed-loop controlled. Centrifugal pumps distinguish themselves by a high volume flow rate and by the capability of regulating the level of this volume flow rate.

The inventors have found that a centrifugal pump is particularly suitable for obtaining a compact and cost-effective cleaning chemical assembly. Specifically, the inventors have found that the ability to switch between different operating modes by means of a precisely controllable speed outweighs the higher complexity of a centrifugal pump in comparison to alternative types of pumps, such as a peristaltic pump, for example, and that altogether a more cost-effective cleaning chemical assembly can be obtained.

The pump may include an EC motor, by means of which the speed of the pump can be varied. EC motors (electronically commutated motors) are electric motors operated by means of direct current, which generate a rotating field themselves for a rotor of the EC motor by means of an electronic control unit and are also known under the name of "brushless direct current motor". The electronic control of an EC motor allows the speed to be particularly well controllable.

In the second operating mode of the pump, the pump can in particular clean each of the flush-out circuits.

This is particularly advantageous if chemically incompatible cleaning solutions can be generated by the cleaning chemical assembly, since residues of the cleaning chemicals can be reliably removed from each of the flush-out circuits by means of the pump in the second operating mode. This allows the same components of the cleaning chemical assembly to be made use of for at least parts of the flush-out circuits without residues of the cleaning chemical or of the cleaning solutions having a negative effect on each other.

In particular, therefore, the pump is temporarily placed in the second operating mode before a changeover is made between a flush-out circuit for a first cleaning chemical and the flush-out circuit for a second cleaning chemical.

In particular, the cleaning chemical assembly includes a sensor that can be used to detect the filling level of the storage container based on a change in concentration.

The inventors have found that by means of the change in concentration of the flushed-out cleaning solution, a conclusion can be reliably drawn as to the filling level within the storage container. This is made possible in particular by the fact that the dissolution rate of the cleaning chemical in the liquid supplied depends on the filling level of the cleaning chemical in the storage container, since the position at which the liquid is fed into the collection container, for example by means of the nozzle, remains unchanged, while the distance between this position and the cleaning chemical inside the storage container changes, in particular increases, as the filling level decreases.

It is of particular advantage if the same sensor that is used for determining the concentration of the flushed-out cleaning solution also provides the measurement data for determining the change in concentration at the same time. In this way, the cleaning chemical assembly according to the invention does not, in particular, require any additional components in order to be able to determine the change in concentration.

In particular, based on the change in concentration, it can be detected whether the storage container is empty. At this point, determining the filling level of the storage container is particularly important, since no further cleaning solution of a desired concentration can be generated once the storage container is empty.

The sensor that can be used to detect the filling level of the storage container based on a change in concentration may be an impedance sensor, a temperature sensor, a turbidity sensor, a conductance sensor, a refractive index sensor, a pH sensor, and/or a photosensor, for example an UV/VIS spectroscopy unit.

The type of sensor that can be used to detect the filling level of the storage container on the basis of a change in concentration is preferably matched to the cleaning chemical employed, so that the value measured in each case presents a reliable indication of the dissolved amount of cleaning chemical in the cleaning solution.

Using the impedance sensor, impedance spectroscopy can be performed. The impedance spectrum obtained is characteristic of the respective cleaning solution and depends on the concentration thereof. Therefore, a particularly reliable determination of changes in concentration is possible by means of the impedance spectrum, in particular by means of the value of the so-called "maximum turning point" (MTP), as described, for example, in Gruden, R. et al.: "*Electrochemical analysis of water and suds by impedance spectroscopy and cyclic voltammetry*" (Journal of Sensors and Sensor Systems, 3, pp. 133-140, 2014). Since the impedance spectrum is characteristic of the particular cleaning solution, a cleaning chemical that is not intended and/or suitable for use in the cooking appliance can also be detected in this way at the same time.

Basically, impedance sensors may be mounted at any point of the cleaning chemical assembly or of a cooking appliance at which a concentration determination and a determination of the composition of the respective liquid or cleaning solution is advantageous, for example also in a water tank of a steam generator or a cleaning agent box of the cooking appliance. In a cleaning agent box, for example, cooking juices accumulate, the concentration of which allows additional conclusions to be drawn about the soiling of the cooking appliance.

In one variant, at least one of the storage containers includes a further sensor, in particular a capacitive sensor, the capacitive sensor being arranged such that the liquid directed by the pump into the storage container comes into contact with the capacitive sensor when a specific amount of cleaning chemical is contained in the storage container, that is, when a particular filling level of cleaning chemical is present in the storage container, in particular when no more cleaning chemical is present in the storage container.

The further sensor serves to check the filling level of the storage container as detected by means of the sensor in the collection container, so that the reliability for detecting the filling level is further enhanced.

In the case of a capacitive sensor, an electric circuit can be closed the current of which supplies the sensor signal of the further sensor as soon as such a quantity of the cleaning chemical in the storage container has been consumed that the capacitive sensor is at least partly exposed and therefore comes into contact with the liquid or cleaning solution.

If the cleaning chemical itself has a certain electrical conductivity, a current can also be measured by means of the capacitive sensor when the capacitive sensor is still covered with cleaning chemical. In this case, however, a sharp increase in current is to be expected as soon as the capacitive sensor is at least partly exposed.

In principle, a plurality of capacitive sensors may also be provided on the storage container, which will be exposed at different filling levels of the storage container.

The object of the invention is further achieved by a cleaning chemical modular system that includes a cleaning chemical assembly of the type described above, a controller being provided which is coupled to the means for identifying the cleaning chemical and is adapted to drive the pump.

The controller of the cleaning chemical modular system can thus evaluate the data obtained through the means for identifying the cleaning chemical and can control the pump for mixing a cleaning solution from the cleaning chemical.

Preferably, the controller is also adapted to interact with the switchover valve or the valve block, so that not only the flow rate, but also the respective flush-out circuit or the respective state can be determined by the controller. Since, on the basis of the means for identifying the cleaning chemical, the controller knows which cleaning chemical is available at which port, the respectively appropriate cleaning solution for a contemplated application can be prepared.

Moreover, the controller may be connected to the sensor or sensors of the cleaning chemical assembly.

Also, according to the invention, the controller does not have to be installed in the cleaning chemical assembly itself, so that the controller can also be employed for further functions in the cooking appliance.

In one variant, the controller is coupled to the temperature sensor and can drive the pump. Thus, the pump of the cleaning chemical assembly can be operated directly based on the values measured by the temperature sensor.

A target concentration of the cleaning solution may be stored in the controller. The target concentration may be stored in the controller as a function of a predetermined cleaning program. In the event that different cleaning solutions can be generated by the cleaning chemical modular system, the target concentration may also be dependent on the respective cleaning solution.

In a preferred variant, at least one characteristic quantity of the cleaning chemicals is stored in the controller, in particular the enthalpy of solution of the cleaning chemicals.

The enthalpy of solution is a matter constant and describes the amount of energy released when a solid is dissolved in a solvent or liquid or the amount of energy required for this process. Accordingly, it can be positive or negative.

For common cleaning chemicals, the respective enthalpy of solution is known in the prior art, in particular it is available in tabulated form. Alternatively, the enthalpy of solution of a cleaning chemical can be determined in a simple manner, for example by measuring the temperature increase or temperature decrease of a given amount of substance of the cleaning chemical in a given volume of liquid.

The inventors have found that such a measurement also provides a particularly simple way of determining the concentration of a cleaning solution in a cleaning chemical modular system.

Further characteristic quantities of the cleaning chemicals include, for example, the solubility and dissolution rate of the cleaning chemical in the liquid.

Preferably, the controller is configured to determine, based on the volume of the liquid in the cleaning chemical assembly, the target concentration of the cleaning solution, the characteristic quantity of the cleaning chemical, and the initial temperature $T_1$, a set temperature $T_3$ at which the concentration of the cleaning solution corresponds to the target concentration of the cleaning solution.

The set temperature $T_3$ may be lower or higher than the initial temperature $T_1$.

The controller may further be configured to compare the current actual temperature $T_2$ as measured by the temperature sensor with the set temperature $T_3$ as determined.

If the actual temperature $T_2$ corresponds to the set temperature $T_3$, in particular a temperature in a tolerance range around the set temperature $T_3$, for example a temperature range from 5% below the set temperature $T_3$ to 5% above the set temperature $T_3$, the controller may be configured to control the valve block such that the cleaning solution generated is drained from the cleaning chemical assembly into the piping system for cleaning the cooking appliance.

In a further variant, the controller is connected to the switchover valve and the sensor that can be used to detect whether one of the two storage containers is empty.

The sensor that can be used to detect whether one of the two storage containers is empty is in particular configured to send a signal when one of the storage containers is empty. In this way, the controller can promptly receive information from the sensor that the respective storage container is empty and that a changeover should be made to the second storage container.

Preferably, the controller is adapted to switch the switchover valve from one state to the other when it is detected on the basis of the signal of the sensor that one of the storage containers is empty. In this way, it is not required that components for evaluating the sensor data be present in the cleaning chemical assembly itself, while reliable actuation of the switchover valve can be ensured.

The controller may be connected to the sensor of the cleaning chemical assembly that is adapted to sense the filling level of the storage container. In this way, information on the current filling level of the storage container is available to the controller, so that the controller can be configured to control the speed of the pump in the second operating mode such that the liquid cleans as large a part of the storage container as possible.

The controller may be connected to that sensor of the cleaning chemical assembly that can be used to detect the filling level of the storage container based on a change in concentration.

In particular, the controller is configured to calculate the change in concentration on the basis of the concentrations obtained from the sensor. Therefore, there is no need for an electronic evaluation unit to be provided in the cleaning chemical assembly itself to determine the change in concentration.

Furthermore, the controller may be configured to compare the calculated concentration change with a threshold value, the threshold value indicating the minimum change in concentration to be expected when the pump flushes out cleaning solution.

As long as the amount of cleaning chemical in the storage container is sufficient, the concentration of the flushed-out cleaning solution usually increases substantially linearly. Once the storage container is empty, the concentration of the flushed-out cleaning solution cannot rise any further, resulting in an asymptotic course of the concentration measured, i.e. a linear range of the concentration increase is followed by a saturation range. In particular, the threshold value is selected such that it appears in that range of the concentration curve in which the linear range of the concentration curve transitions into the saturation range.

In a further variant, the controller is connected to the further sensor of the storage container and/or to the acoustic sensor. In this way, the measurement data relating to the filling level of the storage container and obtained through the further sensor and/or the acoustic sensor can be compared with the filling level determined using the change in concentration.

Furthermore, the controller may be configured to detect, based on the concentration curve determined, if a previously used, i.e., no longer completely filled, storage container has been inserted in the cleaning chemical assembly. In this case, the occurrence of the saturation range is to be expected at an earlier point in time than would be the case if an originally completely filled storage container were used.

In one variant, the controller is further configured to assess, based on the concentration curve determined, the condition of the nozzle by means of which the liquid or the cleaning solution is sprayed or injected into the storage container. For example, a steadily increasing amount of deposits on the nozzle, for example limescale deposits, can be inferred if the time required to reach the saturation range steadily increases. If, on the other hand, the time required to reach the saturation range increases abruptly, it can be concluded that a deposit, for example a limescale deposit that has suddenly become detached, partially or completely obstructs the nozzle.

In yet another variant, the cleaning chemical modular system comprises a conductance sensor, the controller being connected to the conductance sensor and being adapted to determine the water hardness of the liquid on the basis of a change in the conductance thereof.

According to the invention, in this variant provision is made to determine the water hardness not only on the basis of a conductance measured, but on the basis of a change in conductance. The inventors have found that when an identical amount of substance of the cleaning chemical is added to an identical volume of liquid, the change in conductance will vary depending on the water hardness of the liquid in question. In particular, it was found that the conductance of a soft water increases to a greater extent than the conductance of a hard water. It is assumed that this effect is due to the fact that part of the added cleaning chemical reacts with the ions already contained in the water in question, and in this way non-ionic compounds are formed which do not contribute to the conductivity and thus to the conductance measured.

The term "soft water" here refers in particular to water having a degree of hardness of less than 7.3° dH (degrees of German hardness). The term "hard water" here refers in particular to water having a degree of hardness of more than 14° dH.

Basically, instead of the conductance sensor, any other type of sensor may be employed which shows different changes in the respective sensor signal as a function of the water hardness, in order to allow conclusions to be drawn about the water hardness in question.

An initial conductance $G_0$ may be stored in the controller, which indicates the conductance prior to an addition of cleaning solution. The initial conductance $G_0$ may originate from a previous conductance measurement or may be a conductance that was reached after an earlier addition of cleaning solution. If the cleaning chemical modular system has a user interface, the initial conductance $G_0$ may also be defined by a user.

In particular, the controller is adapted to determine an expected conductance $G_1$ based on a predetermined volume and a predetermined quantity of cleaning chemical, and optionally based on the initial conductance $G_0$.

In this context, the predetermined quantity of cleaning chemical is in particular a predetermined amount of substance of cleaning chemical and may be defined, for example, by a flushing time, i.e. by the period of time over which the pump conveys liquid within the flush-out circuit. In this case, the dissolution rate of the cleaning chemical in the particular liquid must be known.

The predetermined quantity of cleaning chemical may also be defined by all of the cleaning chemical held in the storage container being dissolved. To this end, the cleaning chemical modular system may feature a sensor that is adapted to ascertain whether the storage container is empty. Basically, the conductance sensor itself may also be used for this purpose, an empty storage container being detected in particular in that the conductance no longer changes over a predetermined period of time or only changes by a predefined tolerance value around the current measured value.

The controller may be configured to determine the change in conductance as the difference between the expected conductance $G_1$ and an actual conductance $G_2$ ascertained by the conductance sensor. The actual conductance $G_2$ accordingly indicates the conductance as measured by the conductance sensor after addition of the predetermined amount of cleaning chemical.

Multiple determinations may also be carried out to determine the actual conductance $G_2$, so that in particular an averaging of the plurality of measured values obtained can be effected. This allows outliers to be identified and a more reliable determination of the actual conductance $G_2$ to be made possible.

The expected conductance $G_1$ may also be determined on the basis of measured values stored in the controller, which were obtained outside the cleaning chemical modular system. This requires that the measured values stored were obtained under conditions comparable to those in the cleaning chemical modular system, in particular using the same amounts of substance of the same cleaning chemical. In this variant, a one-time measurement of the conductance in the cleaning chemical modular system is already sufficient, since a value for the expected conductance $G_1$ is already available in the control unit and only the actual conductance $G_2$ needs to be determined.

For temperature compensation, the cleaning chemical assembly may include a temperature sensor. Since the conductance is also temperature-dependent, the current temperature of the liquid or cleaning solution can be measured by means of the temperature sensor and a temperature compensation of the measured values of the conductance sensor can be performed using a calibration function.

Generally, the temperature sensor may additionally be utilized to determine whether the storage container is empty. In this case, the same sensor can be made use of for temperature compensation and for determining the amount of cleaning chemical added.

In one variant, the storage container is a calibration storage container and the controller is configured to determine the change in conductance based on the amount of cleaning chemical in the calibration storage container.

The calibration storage container includes a defined amount of substance of cleaning chemical, so that the amount of cleaning chemical used for determining the expected conductance $G_1$ is positively known.

In particular, the calibration storage container may be inserted at one of the ports during initial start-up of the cleaning chemical modular system so that the water hardness at the installation location of the cooking appliance can be determined immediately after initial start-up.

The cleaning chemical assembly may include a means for identifying the calibration storage container, such as, e.g., the switching element that is designed to cooperate with a mechanical coding on the calibration storage container, or the readout element that is designed to read out an identifier on the calibration storage container. Alternatively, the cleaning chemical modular system may also receive information from a user of the cooking appliance via the user interface that a calibration storage container has been inserted at the port of the cleaning chemical assembly.

In particular, the amount of substance of the cleaning chemical within the calibration storage container is smaller than the amount of substance of a cleaning chemical of a storage container as employed in the usual operation of the cleaning chemical modular system. As such, the amount of cleaning chemical required for determining the water hardness is smaller, resulting in a reduction in both the cost and the time needed for the process of determining the water hardness.

In one variant, the cleaning chemical within the calibration storage container is a calibration chemical. In other words, the calibration storage container does not have to employ one of the cleaning chemicals used in the subsequent operation of the cleaning chemical assembly, but can use, for the calibration chemical, any chemical that produces a sufficient change in conductance. Preferably, the calibration chemical allows a particularly simple and/or reliable determination of the water hardness.

In one variant, the cleaning chemical modular system, a cleaning agent box of the cooking appliance and/or a water tank of the cooking appliance includes at least one level electrode that is configured to perform an impedance spectroscopy of the liquid, the cleaning solution and/or a washing liquor.

The impedance spectrum obtained by means of impedance spectroscopy is characteristic of the respective liquid, cleaning solution or washing liquor and depends on the water hardness thereof. A particularly precise determination of the water hardness is possible in particular using the value of the so-called "maximum turning point" (MTP), as described, for example, in Gruden, R. et al.: "*Electrochemical analysis of water and suds by impedance spectroscopy and cyclic voltammetry*" (Journal of Sensors and Sensor Systems, 3, pp. 133-140, 2014).

The water hardness determined by means of the conductance sensor may be verified using the additional impedance spectroscopy, and in this way, the reliability of the water hardness determination may be further increased.

At the same time, impedance spectroscopy can fulfill further functions. Since the impedance spectrum is characteristic of a particular cleaning solution, a cleaning chemical that is not intended and/or suitable for use in the cooking appliance can also be identified at the same time.

If only a single level electrode is provided, the impedance can be measured with respect to ground of a further component of the cooking appliance, for example, with respect to ground of a steam generator of the cooking appliance, in particular if the level electrode is part of a water tank that is in fluid communication with the steam generator.

The correctly determined water hardness allows a reliable estimate to be made of the limescale deposits formed as a result of the liquids used in the cooking appliance, so that the frequency and/or timing of cleaning processes to remove the limescale deposits can be controlled in an optimal manner. In addition, the amount of cleaning chemical can be optimally dosed since, as a rule, less cleaning chemical is required when the water hardness is lower.

Preferably, two level electrodes are provided, which are used for the impedance measurement.

The object of the invention is further achieved by a cooking appliance including a cleaning chemical modular system of the type described above.

As a result of the fact that the cleaning chemicals within the storage containers employed in the cleaning chemical assembly can be reliably identified, the number and type of storage containers used can be adapted to the intended use of the cooking appliance according to the invention as required.

The controller of the cleaning chemical modular system may also control further functions of the cooking appliance at the same time. In this case, no additional controllers or computing units need to be provided for further functions of the cooking appliance.

The cleaning chemical assembly may also be disposed outside the cooking appliance. In other words, the cleaning chemical assembly need not be located inside a housing of the cooking appliance.

The cooking appliance may include a user interface on which the storage containers inserted at the ports of the cleaning chemical assembly can be displayed to a user and/or the user can specify the cleaning chemical contained in the respective storage container.

The respective cleaning chemical of the storage containers inserted at the ports of the cleaning chemical assembly may additionally be displayed on the user interface.

If the user specifies the cleaning chemical contained in the respective storage container, the means for identifying the cleaning chemical may verify the input made by the user and a message may appear on the user interface indicating whether or not the cleaning chemical identified matches the input made by the user.

Alternatively, the input made by the user can overwrite the information received from the means for identifying the cleaning chemical. This allows possible misidentifications to be corrected by a user at any time in order to be able to ensure uninterrupted operation of the cooking appliance.

In particular, the cooking appliance includes a display on which a message appears when one of the storage containers is empty. In this way, a user of the cooking appliance is notified that one of the storage containers is due for replacement.

BRIEF DESCRIPTION OF THE FIGURES

Further advantages and characteristics of the invention will be apparent from the following description of exemplary embodiments and from the drawings, in which.

DETAILED DESCRIPTION OF PREFERRED EMBODIMENTS

Figure 1:
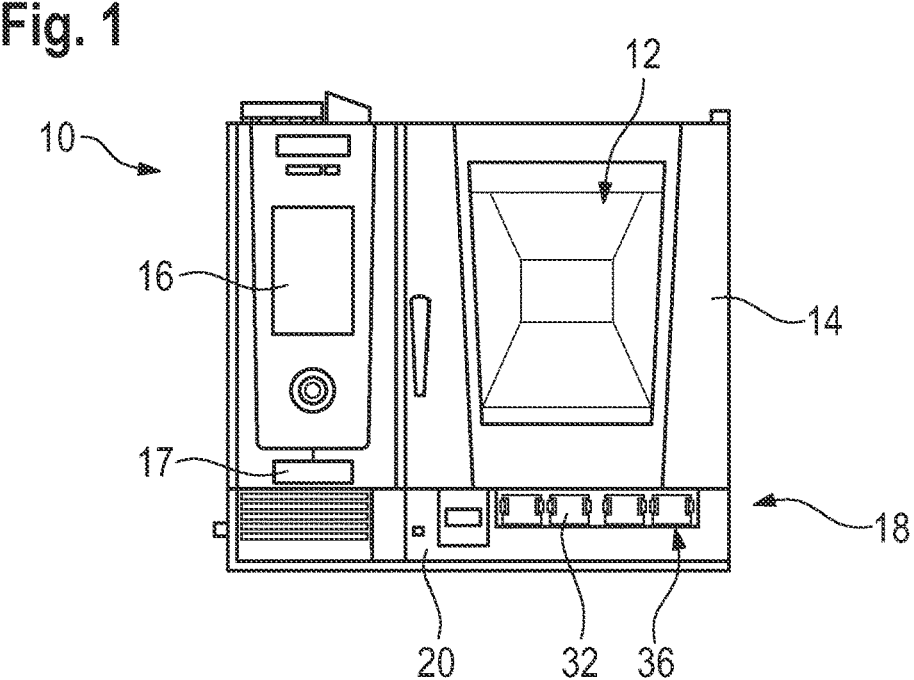
FIG. 1 shows a cooking appliance according to the invention.

FIG. 1 shows a cooking appliance 10 according to the invention. The cooking appliance 10 is a so-called table-top appliance, which is usually operated on a base (not shown). The base may be, for example, a table or another cooking appliance. Basically, however, the cooking appliance could also be a so-called floor-mounted appliance, which is positioned directly on the floor.

The cooking appliance 10 is a so-called combination steamer, in which food can be cooked in a cooking chamber using a cooking chamber atmosphere, which can be controlled in terms of temperature, moisture and circulation rate. More particularly, a cooking appliance for professional applications, for example in restaurants, company canteens and large-scale catering, is involved.

In principle, the cleaning chemical modular system may also be used for other types of cooking appliances, for example for a pan cooking appliance.

A so-called inner case 12 of the cooking appliance 10 can be seen here, which surrounds the cooking chamber and is closed by a cooking chamber door 14.

The cooking appliance 10 features a user interface 16 which is in the form of a touch-sensitive display, i.e. a user of the cooking appliance 10 can control the latter using the user interface 16, and also, the same user interface 16 serves as a display for information on the status as well as for operation of the cooking appliance 10.

The user interface 16 is connected to a controller 17, drawn in schematically in FIG. 1, which controls the assemblies of the cooking appliance 10.

The cooking appliance 10 includes a cleaning chemical assembly 18 according to the invention, which in the embodiment shown is arranged below the inner case 12.

The controller 17 and the cleaning chemical assembly 18 together constitute a cleaning chemical modular system according to the invention.

Figure 2:
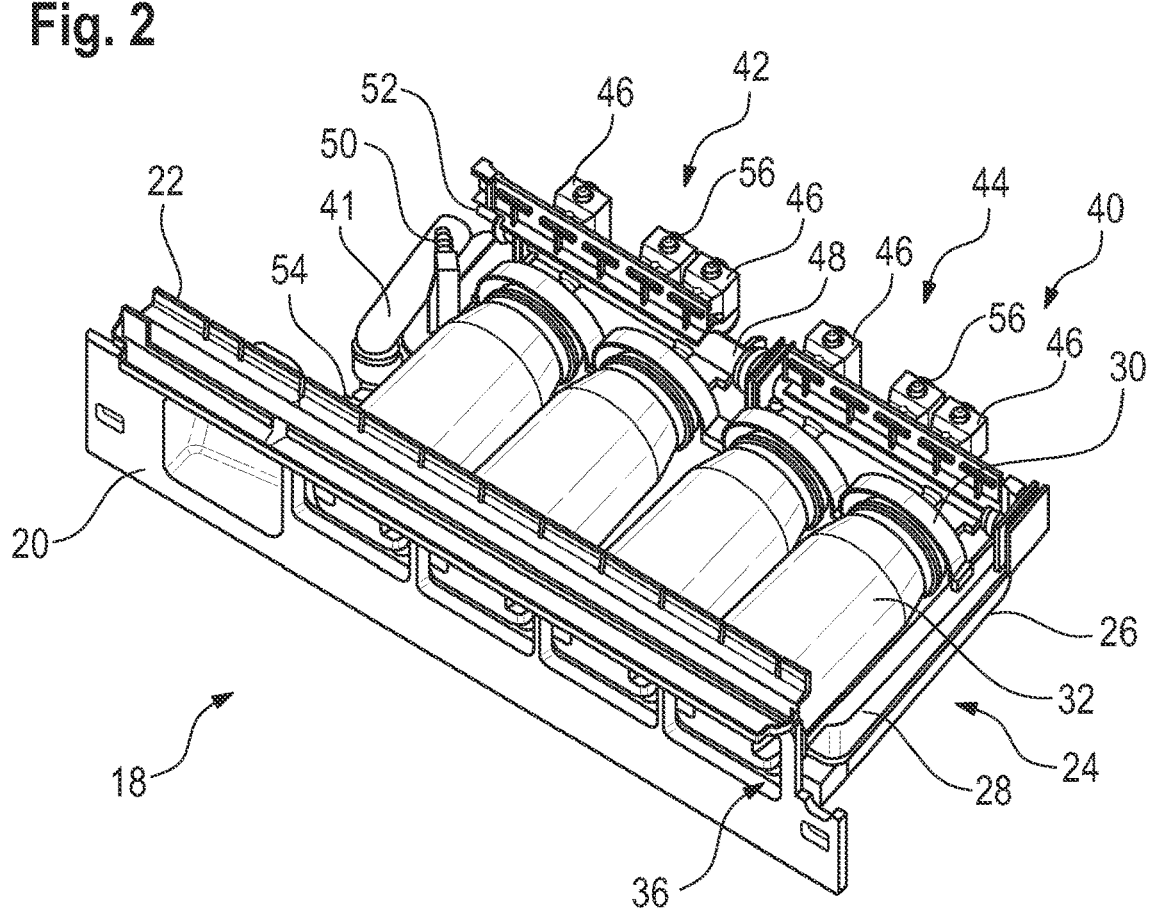
FIG. 2 shows a perspective illustration of a cleaning chemical assembly according to the invention of the cooking appliance of FIG. 1.

FIG. 2 shows a perspective illustration of the cleaning chemical assembly 18 of FIG. 1, only those components being illustrated that are necessary to understand the invention.

The cleaning chemical assembly 18 has a panel 20, which is attached to the cooking appliance 10 by means of a detent element 22, covering the cleaning chemical assembly 18 to the outside.

The cleaning chemical assembly 18 comprises a collection container 24 that is composed of a trough 26 and a cover 28 placed on the trough 26. The trough 26 and the cover 28 engage with each other such that the collection container 24 is sealed for liquids.

A plurality of ports 30 are formed in the cover 28; in the embodiment shown there are a total of four ports 30 arranged side by side at the same level.

Each port 30 has a storage container 32 associated therewith, which is non-destructively detachably connected to the respective port 30. In the embodiment shown, the storage containers 32 are each plugged into the respectively associated port 30 in a fluid-tight manner. For this purpose, each storage container 32 includes a mechanical coding 34 on that end which cooperates with the port 30 in the installation position of the storage container 32 (cf. FIG. 5).

In the embodiment shown, the storage containers 32 are cartridges which can be inserted into and removed again from the cleaning chemical assembly 18 through cutouts 36 in the panel 20.

Figure 5:
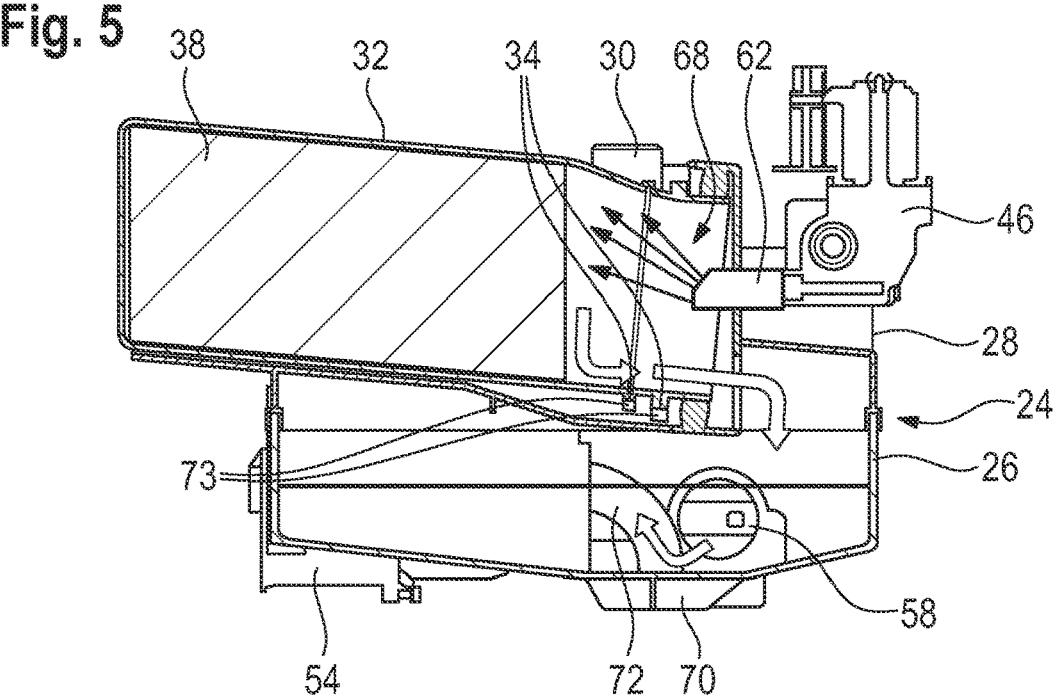
FIG. 5 shows a sectional view of the cleaning chemical assembly of FIG. 2.

The storage containers 32 each hold a cleaning chemical 38 therein (cf. FIG. 5).

The cleaning chemical assembly 18 further includes a valve block 40 which, in the embodiment shown, is composed of two valve block subunits 42 and 44.

Each of the valve block subunits 42 and 44 has two of the ports 30 of the collection container 24 associated therewith, a valve 46 being provided for each associated port 30.

The valves 46 are arranged along a flow pipe 48 of the valve block 40.

The storage containers 32 associated with the valve block subunit 42 hold a first cleaning chemical, and the storage containers 32 associated with the valve block subunit 44 hold a second cleaning chemical that is different from, and chemically incompatible with, the first cleaning chemical.

In the further description, storage containers 32 in which the first cleaning chemical is held will also be denoted by the reference numeral 32a, while storage containers 32 in which the second cleaning chemical is held will also be denoted by the reference numeral 32b. The characteristics and features indicated with respect to the storage container 32 also apply to the storage containers 32a and 32b accordingly, unless anything to the contrary is stated (cf. FIGS. 6 and 7).

Basically, the valve block 40 may also consist of one single valve block subunit or of more than two valve block subunits 42 or 44, which include(s) valves 46 associated with the respective ports 30. Also, more than two different cleaning chemicals may be employed.

The cleaning chemical assembly 18 further features a water inlet 50 through which water can be supplied to the cleaning chemical assembly 18, in particular to the collection container 24.

FIG. 2 furthermore shows a connecting piece 41, via which a valve block inlet 52 of the valve block 40 is connected to a pump 54.

Figure 3:
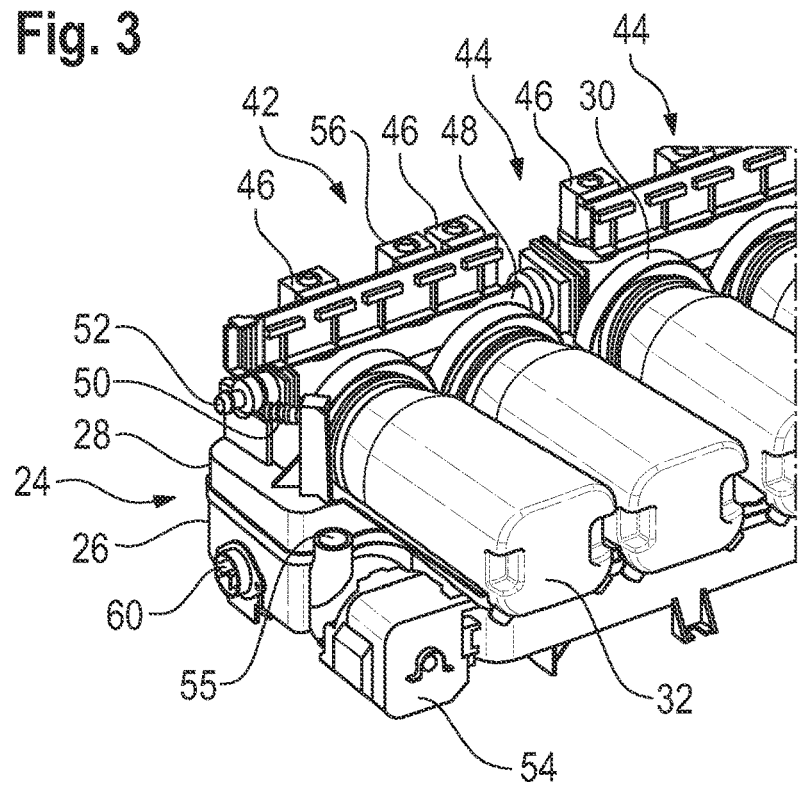
FIG. 3 shows a further perspective illustration of the cleaning chemical assembly of FIG. 2.

FIG. 3 shows a further perspective view of the cleaning chemical assembly 18, the connecting piece 41 not being depicted fora better view.

In FIG. 3, it can be seen more clearly that the pump 54 is connected to and in fluid communication with the trough 26. Liquid received in the collection container 24 can be directed by the single pump 54 to the valve block inlet 52, and thus to the storage containers 32, via a pump outlet 55.

Figure 4:
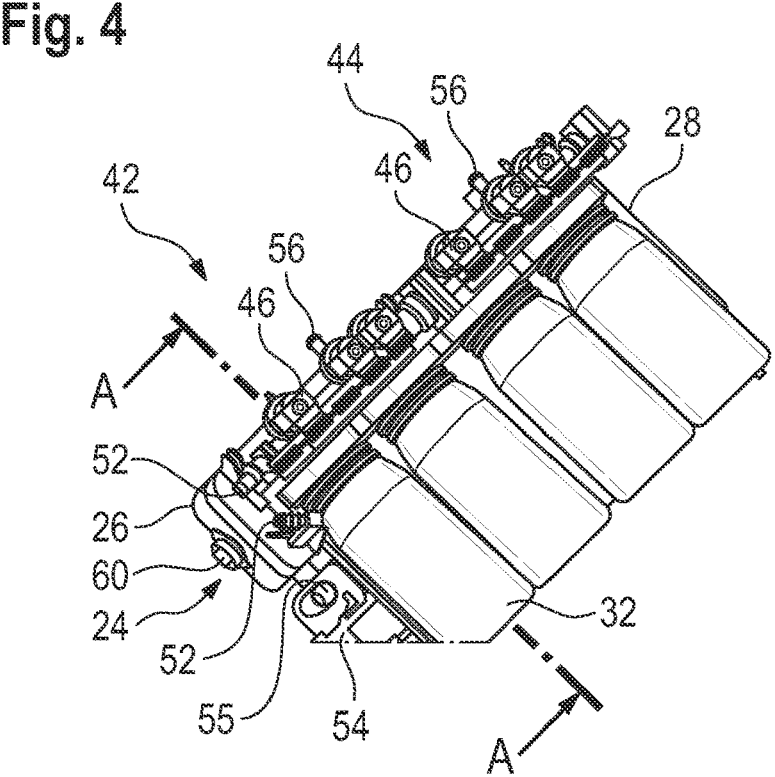
FIG. 4 shows a top view of the cleaning chemical assembly of FIG. 2.

FIG. 4 illustrates a top view of the cleaning chemical assembly 18, in which the structure of the valve block 40 can be better seen.

In addition to the valves 46, each valve block subunit 42 or 44 includes an outlet port 56 that is connected to further piping systems (not shown) of the cooking appliance 10, for example to a cleaning agent box (not shown) or a steam generator (not shown) of the cooking appliance 10.

Furthermore, the collection container 24 includes a sensor 58 (cf. FIG. 5), which is connected to the controller 17 of the cooking appliance 10 by means of a sensor connection 60.

In particular, the sensor 58 is a temperature sensor, a flow sensor, a conductivity sensor, an impedance sensor, a pH sensor, or a refractive index sensor.

The sensor 58 may additionally serve as a filling level sensor, which detects the filling level within the collection container 24. In principle, however, a separate filling level sensor may also be arranged within the collection container 24. Alternatively or additionally, the volume of liquid in the collection container 24 may be known by means of a flow sensor (not shown), which is associated, for example, with the water inlet 50.

In FIG. 5, it can be seen that the valve 46 is in fluid communication with a nozzle 62 that protrudes at least partly into the storage container 32.

The cleaning chemical 38 inside the storage container 32 is a block package, that is, it is provided as a solid in the interior of the storage container 32.

The storage container 32 is arranged so as to be inclined inside the port 30, so that a slope towards the trough 26 is produced.

The trough 26 includes a sink 70 above which a suction pipe 72 is disposed so that liquid can be returned from the trough 26 to the pump 54.

The sensor 58 is arranged within the trough 26.

Further visible in FIG. 5 is the mechanical coding 34 of the storage container 32. The mechanical coding 34 is configured to cooperate with switching elements 73 in the installation position of the storage container 32, locking the mechanical coding 34 in place and in this way retaining the storage container 32 in position.

Moreover, the switching elements 73 are microswitches which are actuated by the mechanical coding 34, wherein the switching elements 73 are connected to the controller 17 (cf. FIG. 1) and send a signal to the controller that a storage container 32 has been inserted.

Since a plurality of switching elements 73 are provided, each of which sends a signal to the controller 17, the controller 17 also acquires the sequence in which the switching elements 73 are triggered by the mechanical coding 34. This makes it possible to distinguish between the storage containers 32a and 32b, since they have differently configured mechanical codings 34.

Thus, for each of the ports 30 of the cleaning chemical assembly 18, the controller 17 detects whether a storage container 32 is inserted at the respective port 30 and which one; in other words, which cleaning chemical 38 is available at which ports 30.

A user of the cooking appliance 10 is then shown, on the display of the user interface 16, with which storage containers 32 or with which cleaning chemicals 38 the cleaning chemical assembly 18 is currently loaded.

The mode of operation of the cleaning chemical assembly 18 to prepare a cleaning solution will be discussed below.

When it is intended to clean the cooking appliance 10 using a washing liquor, the cleaning chemical assembly 18 can provide a cleaning solution, which can then be used to form the washing liquor.

To this end, first a predetermined volume of water is filled into the collection container 24 via the water inlet 50 (cf. FIGS. 2 to 4).

Subsequently, the pump 54 can conduct the water into the valve block 40 via the pump outlet 55, the connecting piece 41 (cf. FIG. 2) and the valve block inlet 52.

The valves 46 of the valve block 40 are controlled by the controller 17 such that the water pumped by the pump 54 is directed into one of the storage containers 32 in which the cleaning chemical 38 is arranged from which the cleaning solution is to be prepared.

The water is sprayed or injected through the nozzle 62 and into the appropriate storage container 32, as indicated by the group of arrows 68 in FIG. 5. In this way, a portion of the cleaning chemical 38 is detached so that an aqueous cleaning solution is formed which, owing to the slope of the storage container 32, flows into the trough 26 of the collection container 24.

As a result, the liquid present within the collection container 24 is now no longer just water, but a cleaning solution. The concentration of the aqueous cleaning solution generated in this manner can be determined by means of the sensor 58, if required.

The cleaning solution can be fed back to the pump 54 through the suction pipe 72. This allows the pump 54 to conduct the cleaning solution through the same flow path again, with a larger amount of cleaning chemical 38 being present in the cleaning solution with each cycle so that its concentration increases.

In other words, a first flush-out circuit is formed that leads from the collection container 24 through the pump 54 and the valve block 40 into the storage container 32 and from there back to the collection container 24.

This process may be repeated for a predetermined period of time to produce a desired concentration of the cleaning solution, in particular if the dissolution rate of the cleaning chemical 38 is known. Alternatively, the sensor 58 may also be used to determine that the cleaning solution has a desired concentration.

When the cleaning solution has a desired concentration, the same pump 54 can be used to establish an outlet fluid communication by which the cleaning solution produced is removed from the cleaning chemical assembly 18 via one of the outlet ports 56.

The cleaning solution produced can then form a washing liquor which is used to carry out a desired cleaning operation of the cooking appliance 10.

If required, water can then be supplied again through the water inlet 50 and the cleaning chemical assembly 18 can be flushed, with the same pump 54 being utilized for the flushing process. In this case, the flushing solution can be removed from the cleaning chemical assembly 18 via a drain port (not shown) of the valve block 40.

By analogy with the first flush-out circuit, the cleaning chemical assembly includes a second flush-out circuit; in this second flush-out circuit, it is not the first cleaning chemical 38a described above that is flushed out of the corresponding storage container 32b, but the second cleaning chemical 38b that is different therefrom. In this case, too, it can be reliably determined by means of the sensor 58 when a storage container 32b of the second cleaning chemical 38b is empty.

Accordingly, at least two different cleaning solutions can be generated by means of the cleaning chemical assembly 18 according to the invention, with a first cleaning solution preferably yielding a washing liquor with a pH value lower than 7 and a second cleaning solution yielding a washing liquor with a pH value greater than 7.

Figure 6:
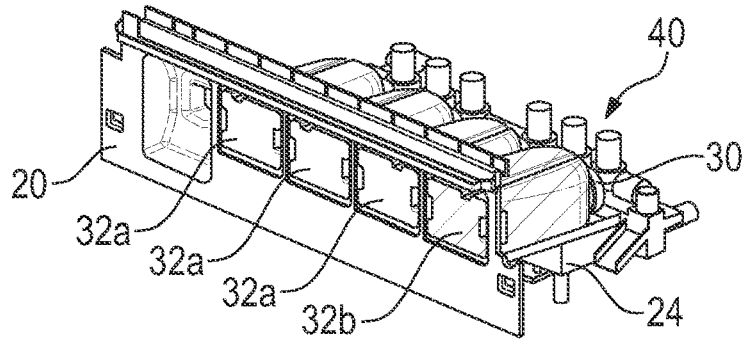
FIG. 6 shows a schematic illustration of the cleaning chemical assembly of FIG. 2 with a first arrangement of storage containers.
Figure 7:
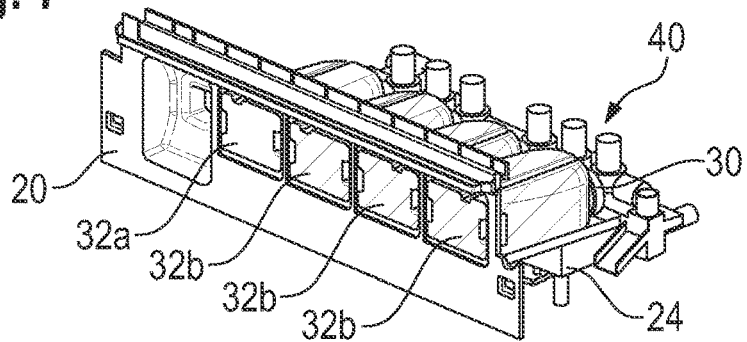
FIG. 7 shows a schematic illustration of the cleaning chemical assembly of FIG. 2 with a second arrangement of storage containers.

In the embodiment shown, the first cleaning solution is generated from the first cleaning chemical 38a in the storage containers 32a and the second cleaning solution is generated from the second cleaning chemical 38b in the storage containers 32b (cf. FIGS. 6 and 7).

A washing liquor having a pH lower than 7 can be advantageously employed, in particular, to remove limescale deposits in the piping system and/or in a steam generator of the cooking appliance 10, whereas a washing liquor having a pH higher than 7 can be advantageously employed, in particular, to remove residues of cooked products from the piping system of the cooking appliance 10.

From this it follows that, depending on the area of use of the cooking appliance 10, it is advantageous to provide a larger number of storage containers 32a or a larger number of storage containers 32b in the cleaning chemical assembly 18, so that a user will have to replace empty storage containers 32 less frequently.

For example, if the cooking appliance 10 is utilized primarily for preparing foods that require large amounts of steam to be used in the cooking appliance 10, as a result of which increased deposits of limescale are to be expected in the piping system (not shown) and/or in the steam generator (not shown) of the cooking appliance 10, it is advantageous to employ more storage containers 32a in the cleaning chemical assembly 18 (cf. FIG. 6), since a washing liquor with a pH value of less than 7 is required more frequently.

If, on the other hand, the cooking appliance 10 is utilized primarily for preparing foods that leave, for example, residues containing oil and grease in the cooking appliance 10, it is advantageous to employ a larger number of storage containers 32b in the cleaning chemical assembly 18 (cf. FIG. 7), since a washing liquor having a pH value greater than 7 is required more frequently.

Figure 8:
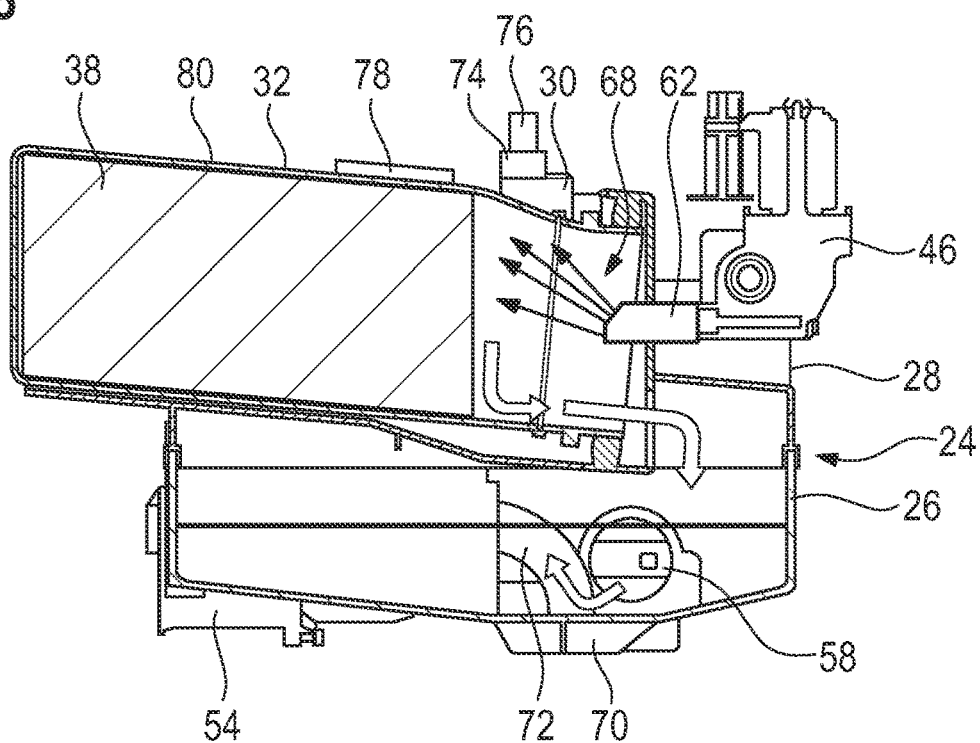
FIG. 8 shows a schematic sectional view, analogous to FIG. 5, of a second embodiment of the cleaning chemical assembly according to the invention.

FIG. 8 schematically illustrates a second embodiment (not according to the invention) of the cleaning chemical assembly 18, which essentially corresponds to the embodiment described above, so that only differences will be discussed. Reference is made to the remarks above.

FIG. 8 shows a sectional view which is analogous to the representation in FIG. 5. However, in the second embodiment, the cleaning chemical assembly 18 includes, as a means for identifying the cleaning chemical, a readout element 74 that is formed as an antenna 76.

The antenna 76 is mounted to the port 30 and is configured to read out an identifier of an RFID tag 78 that is applied to an outer surface of the outer wall 80 of the storage container 32.

The readout element 74 is connected to the controller 17 so that the identifier of the RFID tag 78 read out by the antenna 76 is transmitted to the controller 17.

The controller 17 is configured to associate the identifier with a cleaning chemical 38 so that it can be identified which cleaning chemical 38 is present at the respective port 30.

Figure 9:
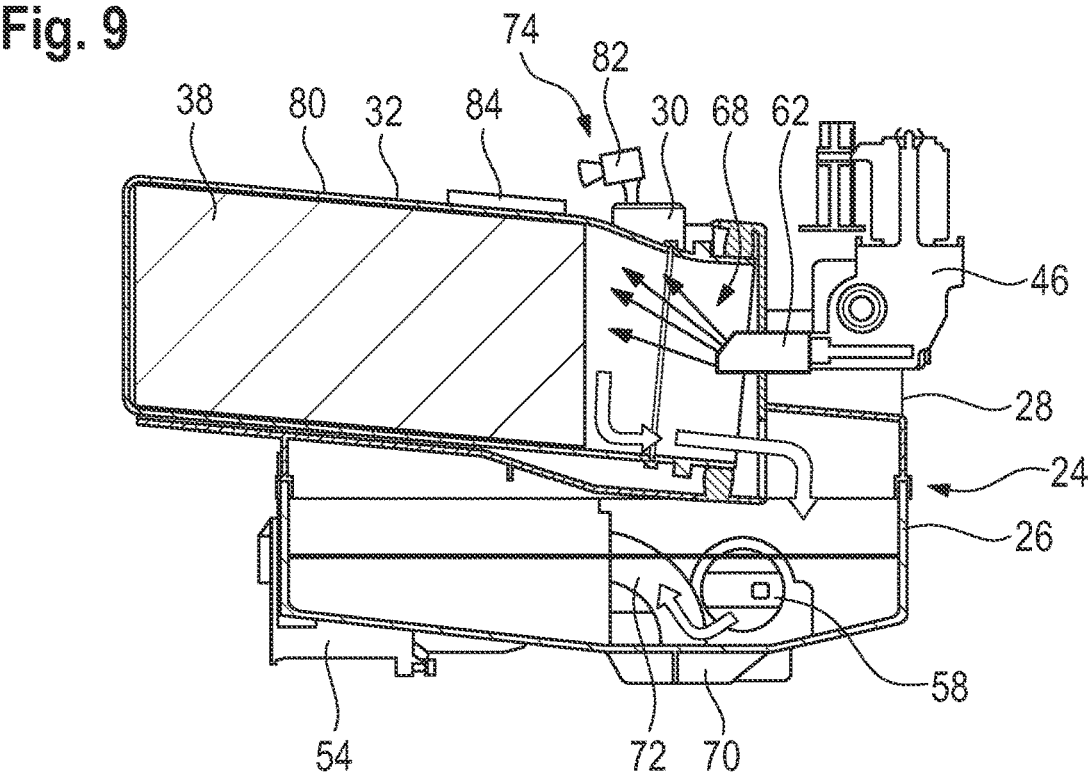
FIG. 9 shows a schematic sectional view, analogous to FIG. 5, of a third embodiment of the cleaning chemical assembly according to the invention.

FIG. 9 schematically illustrates a third embodiment (not according to the invention) of the cleaning chemical assembly 18, which essentially corresponds to the embodiments described above, so that only differences will be discussed. Reference is made to the remarks above.

FIG. 9 shows a sectional view which is analogous to the illustrations in FIGS. 5 and 8. However, in the third embodiment of the cleaning chemical assembly 18, the readout element 74 as the means for identifying the cleaning chemical is an optical sensor 82, here a schematically indicated camera.

The optical sensor 82 is mounted to the port 30 and designed to sense a bar code 84 applied to the outer surface of the outer wall 80 of the storage container 32. Instead of the bar code 84, a data matrix code could also be provided, in particular a QR code.

By analogy with the second embodiment, the readout element 74 is connected to the controller 17 so that the bar code sensed by the optical sensor 82 is transmitted to the controller 17.

The controller 17 is configured to associate the bar code with a cleaning chemical 38 so that it can be identified which cleaning chemical 38 is present at the respective port 30.

The invention claimed is:

1. A cleaning chemical assembly for a cooking appliance, comprising a collection container, a pump, at least two ports for detachably connecting storage containers that contain different cleaning chemicals, and at least one device for identifying the cleaning chemical in the respective storage container,
    wherein the device for identifying the cleaning chemical is a switching element that is configured to cooperate with a mechanical coding on the respective storage container to identify the cleaning chemical held within the storage container and mechanically fix the storage container in place in the cleaning chemical assembly,
    wherein the switching element includes a plurality of microswitches at the ports,
    wherein the cleaning chemical assembly includes, for each port, a flush-out circuit by which the pump can direct liquid from the collection container into the storage container in order to flush out a cleaning solution therefrom, and
    wherein the pump is configured to pump liquid to dissolve cleaning chemical from one of the storage containers in a first operating mode and clean the associated flush-out circuit with the liquid in a second operating mode.

2. The cleaning chemical assembly of claim 1 wherein the cleaning chemical assembly includes a valve block by which the flow path of the flush-out circuit is determined.

3. The cleaning chemical assembly of claim 1 wherein the switching element is designed to lock the mechanical coding of the storage container in place in the port in the installation position.

4. The cleaning chemical assembly of claim 1 wherein a switchover valve is provided that can be switched between a first state, in which the pump can pump liquid from the collection container to the first of the two storage containers while the second storage container is disconnected in a liquid-tight manner, and a second state, in which the pump can pump liquid from the collection container to the second storage container while the first storage container is disconnected in a liquid-tight manner, wherein a sensor is provided that can be used to detect whether one of the two storage containers is empty.

5. A cleaning chemical modular system comprising a cleaning chemical assembly of claim 1 wherein a controller is provided which is coupled to the device for identifying the cleaning chemical and is adapted to drive the pump.

6. A cooking appliance comprising a cleaning chemical modular system of claim 5.

7. The cooking appliance of claim 5 wherein the cooking appliance includes a user interface on which an identity of storage containers inserted at the ports of the cleaning chemical assembly can be displayed to a user and/or the user can specify the cleaning chemical contained in the respective storage container.

8. A cleaning chemical assembly for a cooking appliance, comprising a collection container, a pump, at least two ports for detachably connecting storage containers that contain different cleaning chemicals, and at least one device for identifying the cleaning chemical in a respective storage container,
   wherein the device for identifying the cleaning chemical is a switching element that is designed to cooperate with a mechanical coding on the respective storage container,
   wherein the switching element includes a plurality of microswitches at the ports,
   wherein the cleaning chemical assembly includes, for each port, a flush-out circuit by which the pump can direct liquid from the collection container into the storage container in order to flush out a cleaning solution therefrom,
   the cleaning chemical assembly including a valve block by which the flow path of the flush-out circuit is determined, the valve block comprising an outlet port and a drain port, and
   wherein the valve block is configured to be placed in a condition in which an outlet fluid communication exists between the pump and the outlet port of the cleaning chemical assembly for pumping the liquid to the cooking appliance, and
   wherein the valve block is configured to be placed in a further condition in which there exists a drain fluid communication between the pump and the drain port of the cleaning chemical assembly such that the liquid is discharged from the cleaning chemical assembly without having to discharge the liquid through the outlet port.

9. A cleaning chemical assembly for a cooking appliance, comprising a collection container, a pump, at least two ports for detachably connecting storage containers that contain different cleaning chemicals, and at least one device for identifying the cleaning chemical in a respective storage container,
   wherein the device for identifying the cleaning chemical is a switching element that is designed to cooperate with a mechanical coding on the respective storage container,
   wherein the switching element includes a plurality of microswitches at the ports,
   wherein two storage containers contain the same cleaning chemical, and a switchover valve is provided that can be switched between a first state, in which the pump can pump liquid from the collection container to the first storage container while the second storage container is disconnected in a liquid-tight manner from the liquid pumped by the pump from the collection container while remaining inserted in the cleaning chemical assembly, and a second state, in which the pump can pump liquid from the collection container to the second storage container while the first storage container is disconnected in a liquid-tight manner from the liquid pumped by the pump from the collection container while remaining inserted in the cleaning chemical assembly, wherein a sensor is provided that can be used to detect whether one of the two storage containers is empty, and
   wherein the two storage containers remain inserted into the cleaning chemical assembly when the switchover valve is switched between the first state and the second state.

* * * * *